United States Patent
Park et al.

(10) Patent No.: US 10,645,425 B2
(45) Date of Patent: May 5, 2020

(54) METHOD AND DEVICE FOR MANAGING MULTIMEDIA DATA

(71) Applicants: Samsung Electronics Co., Ltd., Suwon-si, Gyeonggi-do (KR); KOREA ADVANCED INSTITUTE OF SCIENCE AND TECHNOLOGY, Daejeon (KR)

(72) Inventors: Kyung-Mo Park, Seoul (KR); Young-Wan So, Gunpo-si (KR); Gi-Young Nam, Suwon-si (KR); Kyoung-Soo Park, Daejeon (KR); Sang-Wook Bae, Seoul (KR); Dong-Su Han, Seoul (KR); Jae-Yeon Song, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 7 days.

(21) Appl. No.: 15/318,285

(22) PCT Filed: Jun. 15, 2015

(86) PCT No.: PCT/KR2015/005993
§ 371 (c)(1),
(2) Date: Dec. 12, 2016

(87) PCT Pub. No.: WO2015/190893
PCT Pub. Date: Dec. 17, 2015

(65) Prior Publication Data
US 2017/0127095 A1    May 4, 2017

Related U.S. Application Data

(60) Provisional application No. 62/011,884, filed on Jun. 13, 2014.

(51) Int. Cl.
*H04N 21/231* (2011.01)
*H04N 21/2343* (2011.01)
(Continued)

(52) U.S. Cl.
CPC ..... *H04N 21/23106* (2013.01); *H04N 21/222* (2013.01); *H04N 21/23418* (2013.01);
(Continued)

(58) Field of Classification Search
CPC ......... H04N 21/23418; H04N 21/8455; H04N 21/8451; H04N 21/222; H04N 21/23106; H04L 67/2842; G06F 17/30489
See application file for complete search history.

(56) References Cited

U.S. PATENT DOCUMENTS

| | | | | |
|---|---|---|---|---|
| 8,094,872 B1 * | 1/2012 | Yagnik | ............. | H04N 21/23418 380/201 |
| 2003/0093461 A1 * | 5/2003 | Suzuki | ............. | G06F 17/30902 709/202 |

(Continued)

FOREIGN PATENT DOCUMENTS

| KR | 10-2012-0071642 A1 | 7/2012 |
|---|---|---|
| KR | 10-2013-0093741 A1 | 8/2013 |

OTHER PUBLICATIONS

Klone: Deduplicating Video Sharing with Convergent Video Encoding, Department of Electrical Engineering, KAIST, Daejeon, South Korea 2014. pp. 1-8.

*Primary Examiner* — Nasser M Goodarzi
*Assistant Examiner* — Patrick A Ryan
(74) *Attorney, Agent, or Firm* — Jefferson IP Law, LLP

(57) ABSTRACT

A method for managing multimedia data by a contents server comprises the steps of: generating one or more chunks from an input image; generating chunk information of the input image including a list of the generated chunks;

(Continued)

performing an identity check among chunks on the basis of the chunk information of the input image and chunk information stored in the contents server; and updating the stored chunk information according to a result of the identity check, wherein the chunks are a meaningful scene unit in an image.

12 Claims, 7 Drawing Sheets

(51) Int. Cl.
    *H04N 21/845* (2011.01)
    *H04N 21/222* (2011.01)
    *H04N 21/234* (2011.01)

(52) U.S. Cl.
    CPC ... *H04N 21/23439* (2013.01); *H04N 21/8451* (2013.01); *H04N 21/8455* (2013.01); *H04N 21/8456* (2013.01)

(56) References Cited

U.S. PATENT DOCUMENTS

| | | | |
|---|---|---|---|
| 2012/0130721 A1 | 5/2012 | Sirivara et al. | |
| 2013/0254346 A1* | 9/2013 | McGowan | H04L 65/60 709/219 |
| 2013/0305039 A1 | 11/2013 | Cauda | |
| 2013/0311433 A1 | 11/2013 | Gero et al. | |
| 2014/0047185 A1 | 2/2014 | Peterson et al. | |
| 2014/0115579 A1 | 4/2014 | Kong | |
| 2014/0282786 A1* | 9/2014 | Lajoie | H04N 21/2743 725/115 |
| 2014/0310374 A1 | 10/2014 | Lee et al. | |

\* cited by examiner hash_bigbuck_origin.mp4.txt (1) 1          89000061174B2901
(2) 286        CDDD696527965211
(3) 379        E97EE558A6471819
(4) 554        9BB661C69C72C48B
(5) 1146       42F35C87A566335A
(6) 1347       E82BE03C438CF83F

METHOD AND DEVICE FOR MANAGING MULTIMEDIA DATA

This application is a U.S. National Stage application under 35 U.S.C § 371 of an International application filed on Jun. 15, 2015 and assigned application number PCT/KR2015/005993, which claimed the benefit of U.S. Provisional application filed on Jun. 13, 2014 in the U.S. Patent and Trademark Office, and assigned Ser. No. 62/011,884, the entire disclosure of which is hereby incorporated by reference.

TECHNICAL FIELD

The present disclosure relates to a method and device for managing overlapping multimedia content in a network.

BACKGROUND ART

As for dramas, movies, and sports images, many clipped images, such as their trailers or highlight images related to their original images exist on the Internet. When it comes to uploading various images on the Internet sites, such as Facebook, Youtube, etc., a lot of users often edit a single original image and then upload the results. As such, the images edited from the same original image and uploaded by the user are provided by a plurality of contents providers, and thus a lot of similar images are provided in a network. In the meantime, analysis of patterns of users using image content in a network shows that it is more likely for the users to watch drama series, teaser trailers, sports game highlights with a lot of similar images in similar time zones.

Many images provided in a network are determined as the same images to the naked eye of a human, but the images often have different binary data in reality. As such, images looking the same to the naked eye but having different binary data are called "logically identical" images.

The reasons why the logically identical images are generated are as follows:

Firstly, the existing image encoding scheme is designed to maximize compression ratio in an image. Secondly, even if multiple uses upload the same images, operators such as Facebook, Youtube may perform self encoding on the images uploaded by the users depending on their own circumstances, and repetition of the encoding may cause the logically identical images. Thirdly, in a case of performing image encoding according to a multi-thread based image encoding scheme for loss compression, a phenomenon of thread synchronization between threads that encode respective frames that make up an image occurs, and the thread synchronization phenomenon causes the logically identical images because even the same images for encoding have different binary information. Fourthly, in a case of an encoding scheme to insert an I frame, a reference for image decoding, at regular intervals, in image editing, the position of the I frame in an original image and the position of the I frame in an edited image may be different. If the position of the I frame is changed, information about other frames that refer to the I frame is changed and binary information of the respective images is changed, thereby causing logically identical images.

DISCLOSURE

Technical Problem

The present disclosure provides a method and apparatus for reducing network load by deleting logically identical images.

The present disclosure also provides a method and apparatus, by which image data is divided into chunks, chunk information of an image is generated, and chunk information is updated by reflecting chunk information of a new image.

The present disclosure also provides a method and apparatus, by which a content server provides image data to a client via a cache server located in an Internet service provider.

The present disclosure also provides a method and apparatus, by which a cache server provides an image requested by a client through combination to the client.

Technical Solution

In accordance with an aspect of the present disclosure, a method for managing multimedia data in a content server is provided. The method includes generating at least one chunk from an input image, generating chunk information of the input image including a list of the generated chunks, performing sameness check among chunks based on the chunk information of the input image and chunk information stored in the content server, and updating the stored chunk information based on the result of the sameness check, wherein the chunk is a meaningful scene unit in an image.

In accordance with another aspect of the present disclosure, a content server for managing multimedia data is provided. The content server includes an encoder for generating at least one chunk from an input image, and a controller for generating chunk information of the input image including a list of the generated chunks, performing sameness check among chunks based on the chunk information of the input image and chunk information stored in the content server, and updating the stored chunk information based on the result of the sameness check, wherein the chunk is a meaningful scene unit in an image.

MODE FOR INVENTION

Figure 1:
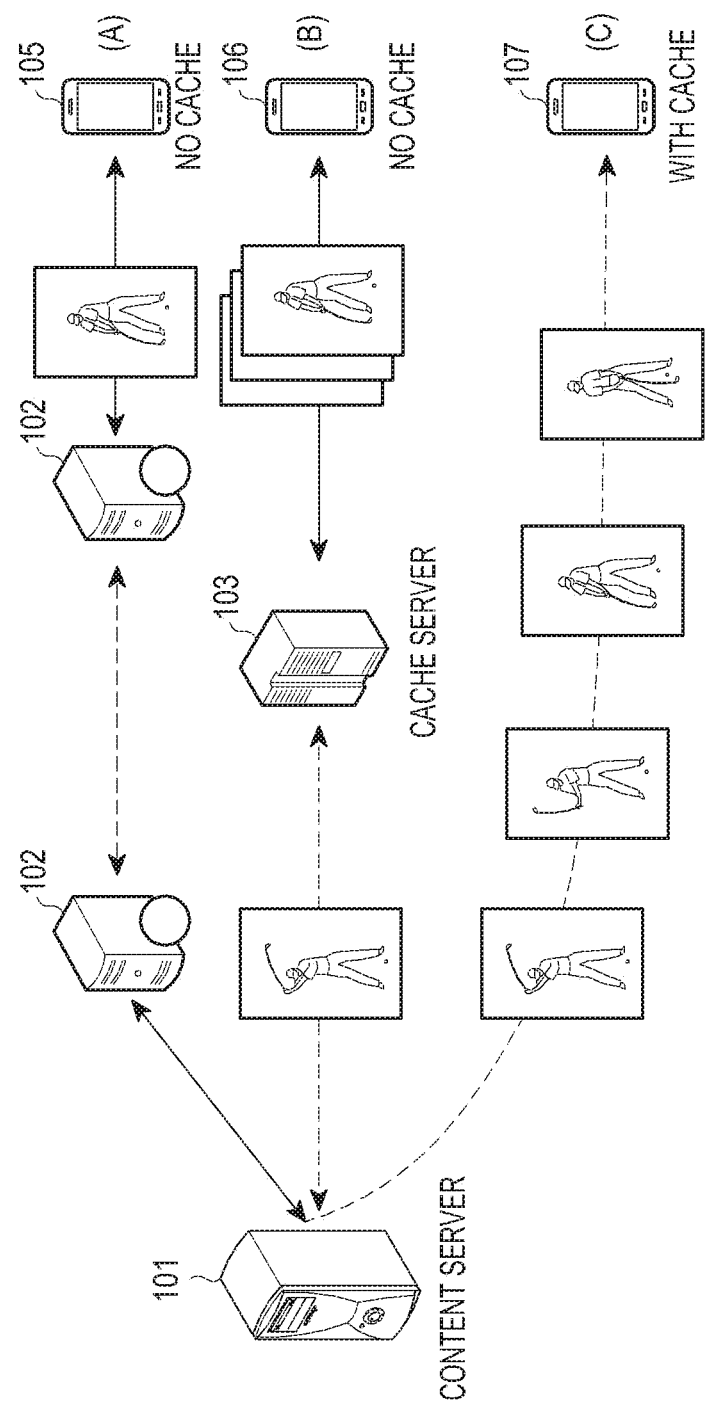
FIG. 1 shows an image content transmission and reception system, according to embodiments of the present disclosure.

Descriptions of some well-known technologies that possibly obscure the invention will be omitted, if necessary. Embodiments of the present disclosure will now be described with reference to accompanying drawings.

While the embodiments as will be described below are separated for convenience of explanation, two or more embodiments may be performed by being combined within a non-conflicting range.

Further, terms, as will be mentioned later, are defined by taking functionalities of embodiments of the present disclosure into account, but may vary depending on certain practices or intentions of users or operators. Accordingly, the definition of the terms should be made based on the descriptions throughout this specification.

The disclosure now will be described more fully hereinafter with reference to the accompanying drawings, in which illustrative embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~", or the like.

The terminology as used herein is only used for describing particular embodiments and not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Various embodiments of the present disclosure will now be described with reference to accompanying drawings. Like numbers refer to like elements throughout. Detailed description of well-known functionalities and configurations will be omitted to avoid unnecessarily obscuring the present disclosure. Descriptions of some well-known technologies that possibly obscure the disclosure will be omitted, if necessary.

Prior to a detailed description of the present disclosure, basic concepts of embodiments of the present disclosure will be briefly described.

The present disclosure is to reduce network traffic caused by the existence of a lot of logically overlapping images in the network. In the present disclosure, a content server divides a new image input to the content server into chunks, each being a meaningful scene unit, and generates chunk information about the chunks that constitute the image. It then compares the information of the chunks with chunk information already stored in the content server (called "recipe") to perform sameness check among chunks.

If the result of checking reveals that the generated chunk is similar to the stored chunk, previous chunk information included in the recipe may be updated to be the latest chunk information about the corresponding chunk, and the corresponding chunk may be stored. However, in some instances, for the similar chunk, the chunk information may not be updated and the chunk may not be stored.

If the result of checking reveals that the generated chunk is the same as the stored chunk, previous chunk information included in the recipe is updated to the latest chunk information. Since the generated chunk is the same as the already stored chunk, the newly generated chunk is deleted. Although the same chunks as the stored chunks are deleted, corresponding chunk information of the chunks is updated to the latest one.

If the result of checking reveals that the generated chunk is a new chunk not stored, the new chunk is stored and the chunk information of the corresponding chunk is included in the recipe.

In the present disclosure, a client (or terminal) may be provided through a cash server in a network. The cash server requests and receives chunk information about a requested image from the content server, determines a chunk that is not stored in the cash server using the received cash information, and requests and receives the chunk not stored and header information of the image from the content server. After that, using the chunk received from the content server and the chunk stored in the cache server, the corresponding image is composed and the result is sent to the client.

Although embodiments of the present disclosure are described based on image data, what is provided in the present disclosure may be applied not only to the image data but also to multimedia data that could be logically overlapping content in the network.

Embodiments of the present disclosure will now be described in detail.

FIG. 1 shows an image content transmission and reception system, according to embodiments of the present disclosure.

A content server 101 of the present disclosure may compose binary data of logically identical images to be the same when encoding image data, and delete a logically overlapping image. Specifically, configuration and operation of the content server 101 will be described later in connection with FIG. 2.

Referring to FIG. 1, (A) is an occasion when the content server 101 and a normal terminal 105 without its own cache provide image content through an image distribution system 102 in a typical network. (B) is an occasion when the content server 101 provides image content to a normal terminal 106 without its own cache through a cache server 103. (C) is an occasion when the content server 101 provides image content to a terminal 107 with its own cache.

In the case of (A), the content server 101 deletes a logically overlapping image. Accordingly, using the content server 101 as proposed in the present disclosure reduces traffic of image data in the network as compared to an occasion when a content server using an existing scheme is used to provide image content through the image distribution system 102.

In the case of (B), to provide an image to the terminal 106, the cache server 103 in the present disclosure requests and receives chunks that are not owned by the cache server 103 among parts that constitute the image, and combines the received chunks and chunks it has. Accordingly, through the operation of the content server 101 and the operation of the cache server 103, traffic in the network may be reduced. For reference, the term "chunk" is a unit into which an image is divided in the present disclosure, which will be described below in connection with FIG. 2.

In the case of (C), since the terminal 107 includes a cache that operates in the same or similar way to that of the cache server 103, traffic of the image data received by the terminal 107 may be reduced.

Figures 2, 3:
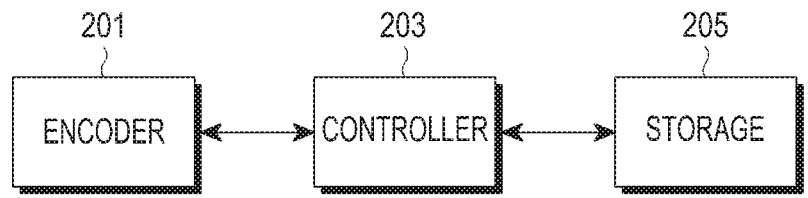
FIG. 2 is a block diagram of a content server 101, according to an embodiment of the present disclosure.
FIG. 3 shows an example of chunk information about chunks, according to the present disclosure.

FIG. 2 is a block diagram of the content server 101, according to an embodiment of the present disclosure.

The content sever 101 includes an encoder 201, a controller 203, and a storage 205.

The encoder 201 encodes an image uploaded to the content server 101 and divides the image. For reference, in an embodiment of the present disclosure, the encoder 201 may apply encoding of a cache-friendly encoding library scheme modified from an H.264 encoding scheme to make logically identical images include the same binary data.

In the present disclosure, an image to be divided may be divided into scene units having particular meanings. For this, for example, a certain function such as a scene-detection function may be used to divide the image into meaningful scene units. For example, as for a singer's concert image, a scene of the singer singing, a scene of audience, etc., may be examples of meaningful scenes. The phrase "meaningful scene unit" as herein used will be referred to as the "chunk". Dividing an image into chunks in the present disclosure is distinguished from the existing encoding scheme that divides an image into predetermined time units or predetermined size units. The chunk is configured to include at least one group of picture (GOP), and these chunks may be combined into an image.

The controller 203 generates chunk information about the generated chunk, and store the chunks and chunk information in the storage 205.

The chunk information will now be described.

The chunk information includes perceptual hash (phash) values for the respective chunks. The phash is a 64-bit long value, and used as an identifier (ID) of the chunk. For reference, phash is a value generated based on a DCT coefficient of a still image, and checking similarity among phash values may be used to check similarity of the chunks. Specifically, a hamming distance between the phash values may be calculated to determine whether the phash values are similar to each other. For example, phash values with the hamming distance equal to or less than 4 may be determined to be similar. Accordingly, if measurements of hamming distance between phash values determine that the phash values are similar, it may be determined that the chunks corresponding to the phash values are similar.

The chunk information may include not only the phash value but also at least one of resolution, frame rate, frame length, etc., of the chunk. In the present disclosure, the chunk information of the chunk may be used in determining sameness or similarity between chunks.

FIG. 3 shows an example of chunk information about chunks, according to the present disclosure.

Assuming that FIG. 3 is chunk information of image A, the first column represents the position of frame at which the chunk begins and the second column represents the value of pHash, i.e., the ID of the chunk.

In FIG. 3, the image A includes 6 chunks from (a1) to (a6). It represents that chunk (a1) begins at frame 1 and includes frames up to frame 285, and the ID of the chunk (a1) is "(m1)89000061174B2901". Likewise, it represents that chunk (a2) begins at frame 286 and includes frames up to frame 378, and the ID of the chunk (a2) is "(m2) CDDD696527965211". In the same way, the position at which the corresponding chunk begins and the chunk ID are represented for chunks (a3) to (a6). The controller 203 stores the chunk information created in this way in the storage 205. Information of the chunk information stored in the storage 205 will be referred to as a "recipe". That is, the recipe includes information about chunks that constitute the image A.

Furthermore, the controller 203 may generate chunk information about chunks generated by the encoder 201 according to the aforementioned method, update chunk information of the recipe by checking sameness among chunks based on the chunk information included in the recipe stored in the storage 205, and store necessary chunks in the storage 205. Upon reception of a request for a particular image from a client, it may combine chunks to generate a requested image and provide the image to the client. In the present disclosure, however, besides the generated image being provided directly to the client, the image may be provided to the client via a cache server located in an Internet Service Provider (ISP). An embodiment of providing an image through a cache server to a client will be described later in connection with FIGS. 5 and 6.

As an example of the operation as described above, after the chunk information about the image A is stored in the storage 205, if an image A' logically identical to the image A is uploaded to the content server 101, the encoder 201 may divide the image A' into at least one chunk. The controller 203 may generate chunk information of the image A', compare the chunk information of the image A' with the stored chunk information (i.e., recipe) of the image A to check sameness between chunks of the image A and chunks of the image A', update the recipe stored in the storage 205 according to the checking result and store required chunks.

Figure 4:
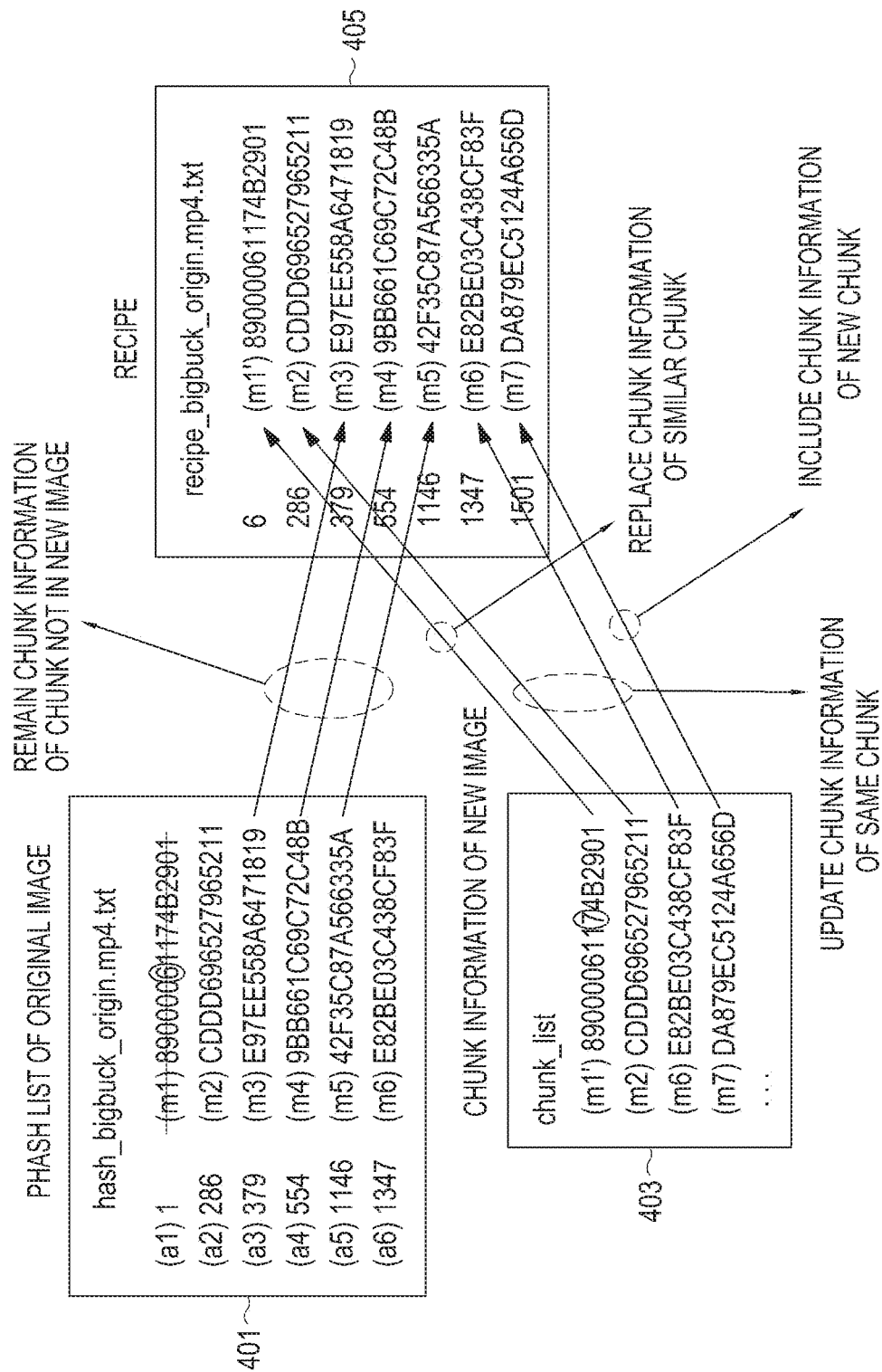
FIG. 4 shows an example of updating a recipe by checking sameness of chunks, according to an embodiment of the present disclosure.

FIG. 4 shows an example of updating a recipe by examining sameness on chunks, according to an embodiment of the present disclosure.

Reference numeral 401 represents chunk information of the image A shown in FIG. 3, reference numeral 403 represents chunk information of the image A', 405 represents chunk information updated according to a result of checking sameness between the chunks of the image A' and the chunks already stored in the storage based on the chunk information of the image A' and the chunk information of the image A.

The chunk information 401 of the image A includes m1, m2, m3, m4, m5, m6, and the chunk information 403 of the image A' includes m1', m2, m6, m7. For reference, it is indicated that m1' included in the chunk information 403 of the image A' is similar to m1 included in the chunk information 402 of the image A'. As described above, if a hamming distance between two chunk ID values is equal to or less than a threshold, e.g., 4, it may be determined that the two are similar.

Comparing the ID values of the two chunks, m1' included in the chunk information 403 of the image A' is similar to m1 included in the chunk information 401 of the image A, and m2, m6 included in the chunk information 403 of the image A' also exist in the chunk information 401 of the image A. In the meantime, m7 included in the chunk information 403 of the image A' is a chunk ID of a new chunk not included in the chunk information 401 of the image A.

In this situation, a recipe 405, the chunk information stored in the storage 205, may be updated as follows:

In the first case where a chunk generated by the encoder 201 is similar to the chunk stored in the storage 205, the controller 203 may update chunk information of the chunk included in the recipe to latest chunk information and store the generated chunk in the storage 205. In an example of FIG. 4, since m1' is similar to m1, it may be seen that m has been updated to m' in the recipe 405. Furthermore, a chunk with the value of m' is stored in the storage 205.

Although FIG. 4 shows that the recipe 405 is updated with m', chunk information for a similar chunk may not be updated but the previously stored chunk information may remain in some instances. Similar chunk IDs means, for example, two chunk images are very similar, such as chunks m1 and m1' obtained by adding a subtitle to m1. Accordingly, in some cases, m1 may not have to be updated to m1' in the recipe 405.

In the second case where a chunk generated by the encoder 201 is the same as the chunk stored in the storage 205, the controller 203 updates previous chunk information included in the recipe to the latest chunk information. However, since the chunk generated by the encoder 201 is the same as one already stored in the storage 205, the chunk generated by the encoder 201 is deleted. In other words, the same chunks as those stored are deleted, but the chunk information of the corresponding chunks is updated to the latest one.

In the example, m2 and m6 included in the chunk information 403 of the image A' are included in the chunk information 401 of the image A. In this case, m2 and m6 are updated in the recipe 405, and newly generated chunks corresponding to the newly generated m2 and m6 are deleted in the encoder 201.

In the third case where a chunk generated by the encoder 201 is a new chunk not stored in the storage 205, the new chunk is stored in the storage 205 and chunk information of the chunk is newly included in the recipe.

In the example, since m7 included in the chunk information 403 of the image A' is an ID of a new chunk not included in the chunk information 401 of the image A, m7 is newly included in the recipe 405 and a chunk corresponding to m7 is stored in the storage 205. For reference, a frame start position of m7 may be determined using frame length from the frame start position 1347 of m6 to the chunk included in the chunk information. In FIG. 4, the frame start position of m7 is shown to be 1501.

In FIG. 4, it was described that sameness of chunks are checked by comparison of chunk IDs included in the chunk information. However, the sameness check among chunks may be performed by comparing not only chunk IDs, but also other information, e.g., at least one of resolutions, frame rates, frame lengths.

Figure 5:
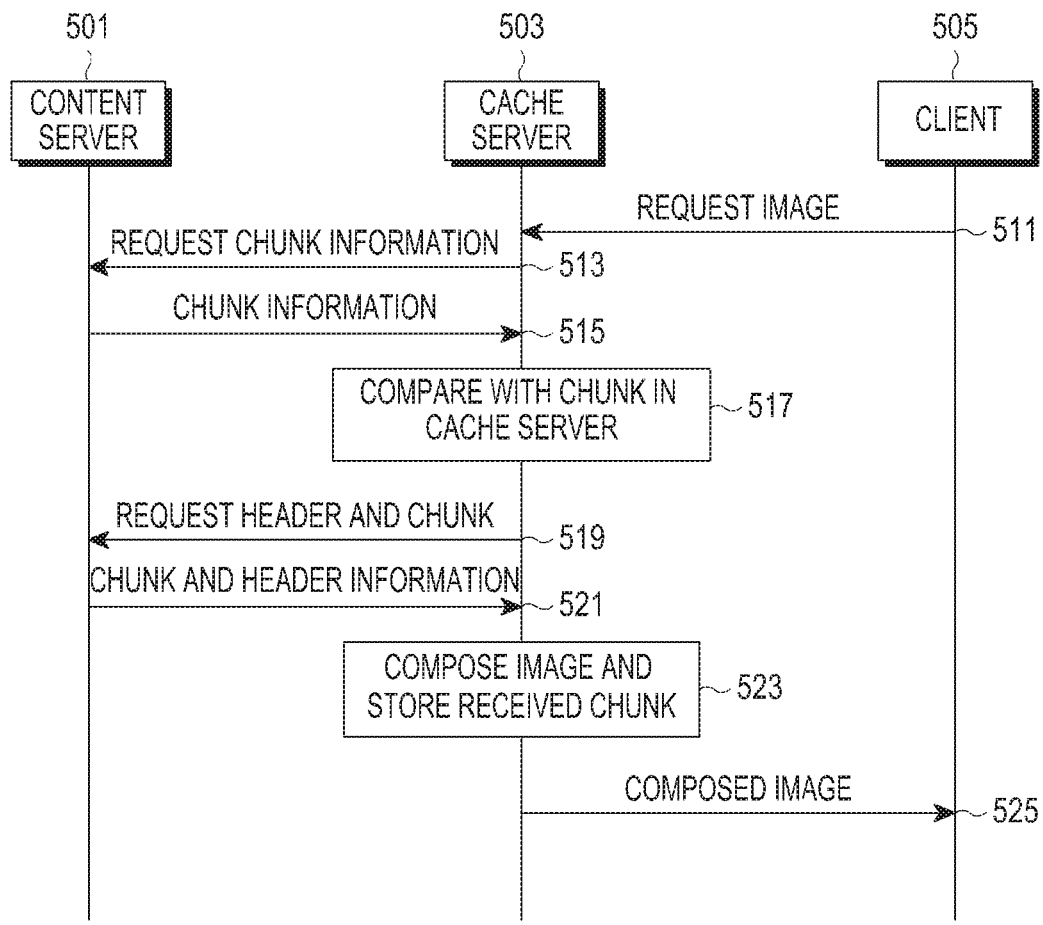
FIG. 5 shows a procedure of obtaining image data by a client from a content server via a cache server, according to an embodiment of the present disclosure.

FIG. 5 shows a procedure of obtaining image data by a client from a content server via a cache server, according to an embodiment of the present disclosure.

In the embodiment of FIG. 5, a client does not obtain an image directly from a content server but via a cache server 503. The cache server 503 is located in e.g., an Internet Service Provider (ISP) and operates with a content server 501 according to a preset protocol, thereby reducing overlapping traffic between the content server 501 and the cache server 503 and enhancing quality of experience (QoE) of a corresponding image by transmitting image data more quickly to the client 505.

In step 511, the client 505 transmits an image request message to the cache server 503 to request the cache server 503 to provide a desired image. In step 513, the cache server 503 receives the image request message and requests the content server 501 not for the corresponding image but for chunk information about the corresponding image. This is for the cache server 503 to determine which chunks constitute the corresponding image. Upon reception of the request for the chunk information, the content server 501 transmits the chunk information about the corresponding image to the cache server, in step 515. How the content server 501 composes and updates the chunk information was described in connection with FIGS. 3 and 4.

In step 517, the cache server 503 analyzes the received chunk information to check whether the chunks constituting the corresponding image are included in the cache server 503. Such checking may be performed in the same way as the checking of sameness among chunks in connection with FIG. 4. In step 519, the cache server 503 requests chunks that are not owned by the cache server 503 and header of the corresponding image based on the checking result of step 517. In step 521, the content server 509 sends the requested chunk and header information of the corresponding image to the cache server 503. In step 523, the cache server 503 composes an image by combining the received chunks and chunks it has, and the header of the corresponding image. The received chunks are stored in the cache server 503 to be used when other users request the image. After that, in step 525, the composed image is transmitted to the client 505.

For reference, in relation to configuration of the cache server 503, although not shown in FIG. 5 for convenience sake, a controller may control the entire operation, a transceiver may transmit or receive signals to or from an external entity, and a cache storage may store chunks and chunk information.

Figure 6:
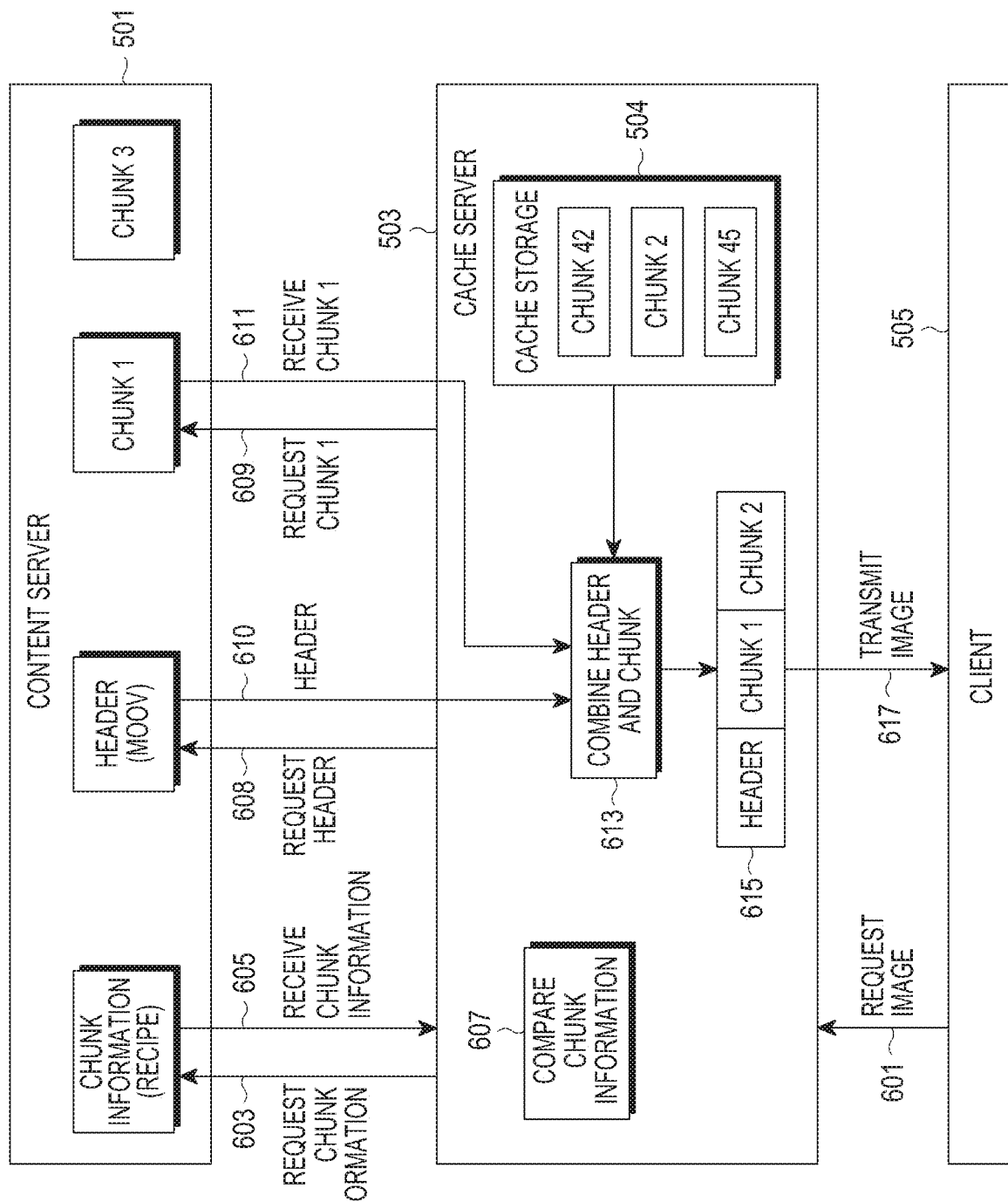
FIG. 6 shows an example of an image providing scheme as described in FIG. 5, according to an embodiment of the present disclosure.

FIG. 6 shows an example of an image providing scheme as described in FIG. 5, according to an embodiment of the present disclosure.

Steps 601 to 617 of FIG. 6 proceed in the same order of steps 511 to 525 of FIG. 5. It, however, shows an example of providing an image to the client 505 with examples of actual chunks added to the image.

In step 601, the client 505 requests the cache server 503 to provide a desired image, and in step 603, the cache server 503 requests the content server 501 for chunk information about the image. In step 605, the content server 501 transmits chunk information about the image stored in its storage 205 (i.e., a recipe) to the cache server 503.

In step 607, the cache server 503 analyzes the received chunk information to check whether the chunks constituting the corresponding image are included in the cache storage 504 in the cache server 503. Assume herein that the image is comprised of a chunk 1 and a chunk 2. FIG. 6 shows that chunk 42, chunk 2, and chunk 45 are included in the cache storage 504. The cache storage 504 includes chunk 2 but no chunk 1 among chunks required to compose the image. Accordingly, the cache server 503 requests header and chunk 1 of the image from the content server 501 in steps 608 and 609. For reference, the header is information corresponding to Moove part. Upon reception of the request, the content server 501 transmitted the header and chunk 1 to the cache server 503 in steps 610 and 611. The cache server 503 combines the header, chunk 1, chunk 2 received in step 613 to generate a combined image 615, and transmits the combined image to the client in step 617. The cache server 503 stores the received chunk 1 in the cache storage 504.

Figure 7:
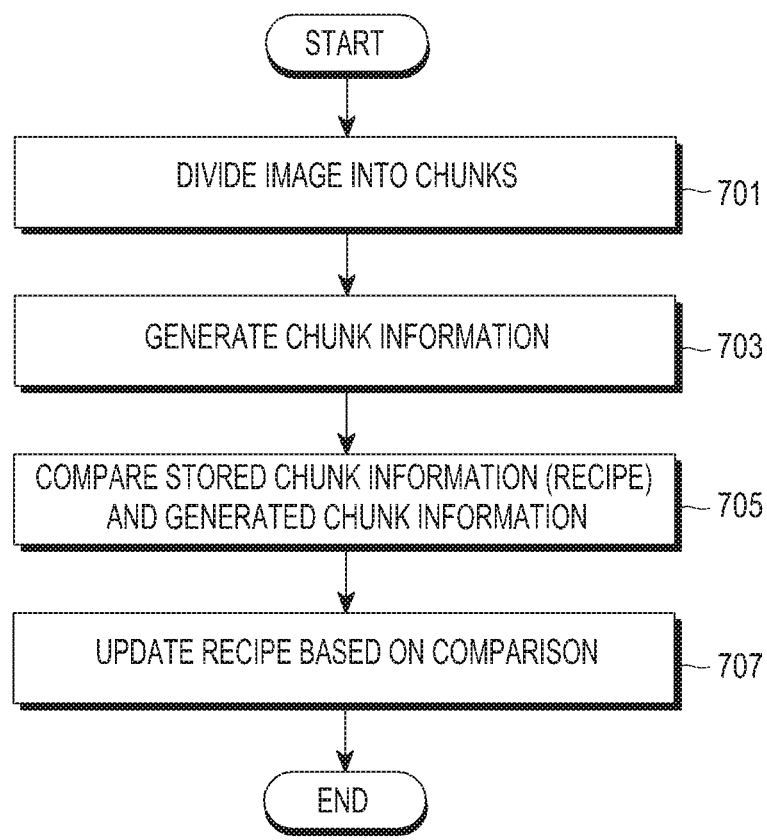
FIG. 7 is a flowchart illustrating operation of a content server, according to an embodiment of the present disclosure.

FIG. 7 is a flowchart illustrating operation of a content server, according to an embodiment of the present disclosure.

In step 701, a content server divides a newly input image into chunks, and in step 703, generates chunk information of the image. In step 705, checking sameness among chunks is performed by comparing already stored chunk information (i.e., recipe) and the chunk information generated in step 703. In step 705, subsequent operation is performed according to the sameness checking result. Detailed operation is the same as what is described in connection with FIG. 2.

Specifically, in the first case where the generated chunk is similar to the stored chunk, previous chunk information included in the recipe may be updated to be the latest chunk information about the corresponding chunk, and the corresponding chunk may be stored. In some instances, however, the chunk information of a similar chunk may not be updated but the previously stored chunk information may remain the same.

In the second case where the generated chunk is the same as the stored chunk, previous chunk information included in the recipe is updated to the latest chunk information. Since the generated chunk is the same as the already stored chunk, the newly generated chunk is deleted from the encoder 201. Although the same chunks as the stored chunks are deleted, corresponding chunk information about the chunks is updated to the latest one.

In the third case where the generated chunk is a new chunk not stored, the new chunk is stored and the chunk information about the chunk is newly included in the recipe.

Figure 8:
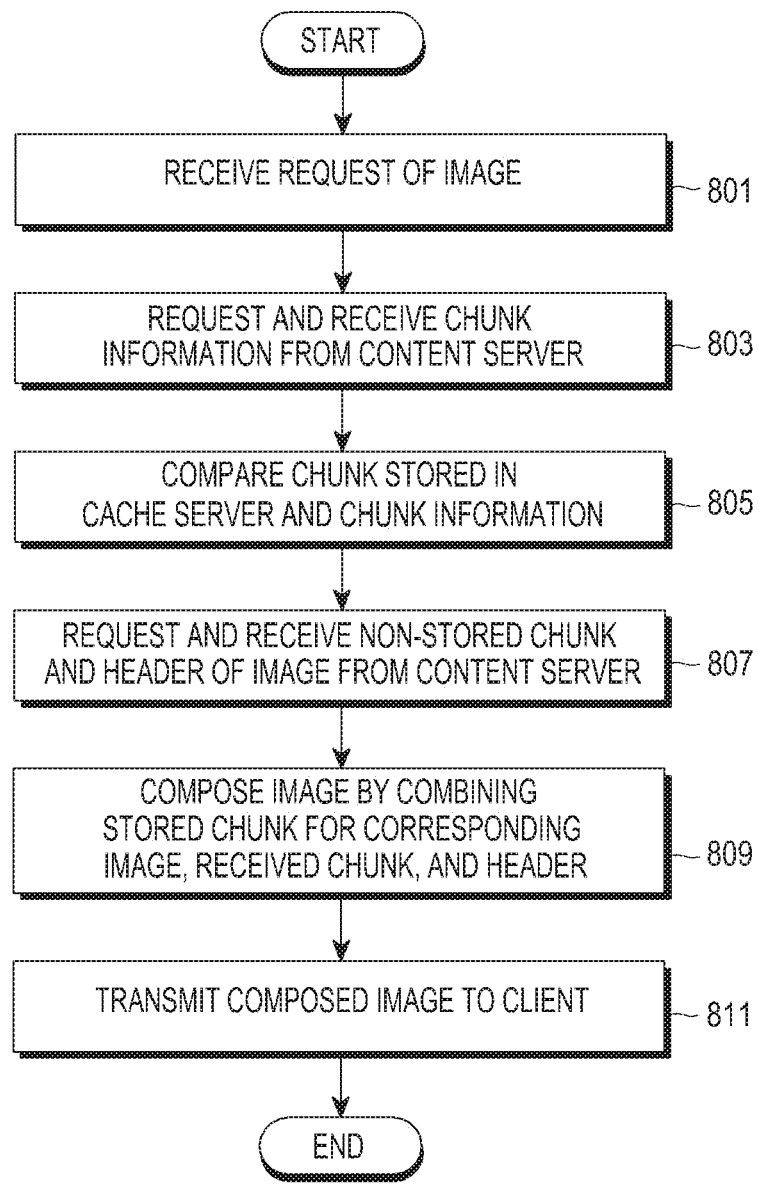
FIG. 8 is a flowchart illustrating operation of a cache server, according to an embodiment of the present disclosure.

FIG. 8 is a flowchart illustrating operation of a cache server, according to an embodiment of the present disclosure.

In step 801, upon reception of a request for an image from the client, in step 803, it requests and receives chunk information from the content server. In step 805, sameness check is performed by comparing the received chunk information and chunk stored in the cache server. In step 807, based on the checking result, it requests and receives chunks not stored in the cache server and header of the corresponding image from the content server. After that, in step 809, it combines the stored chunks related to the image, the chunks received from the content server, and header information to compose an image, and in step 811, transmits the composed image to the client.

Particular aspects of the present disclosure may be implemented as computer-readable codes in a computer-readable recording medium. The computer-readable recording medium is any data storage device that may store data readable to computer systems. For example, the computer-readable recording medium may include Read Only Memories (ROMs), Random Access Memories (RAMs), CD-ROMs, magnetic tapes, floppy discs, optical data storage devices, and carrier waves. The computer-readable recording medium may be distributed by computer systems connected over a network, and thus the computer-readable codes may be stored and executed in distributed ways. Furthermore, functional programs, codes, and code segments for achieving various embodiments of the present disclosure may be readily interpreted by skilled programmers in the art to which embodiments of the present disclosure are applied.

It will be appreciated that the embodiments of the present disclosure may be implemented in a form of hardware, software, or a combination of hardware and software. The software may be stored as program instructions or computer readable codes executable on the processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The method in accordance with an embodiment of the present disclosure may be implemented by a computer or portable terminal including a controller and a memory, and the memory may be an example of the computer readable recording medium suitable for storing a program or programs having instructions that implement the embodiments of the present disclosure.

The present disclosure may be implemented by a program having codes for embodying the apparatus and method described in claims, the program being stored in a machine (or computer) readable storage medium. The program may be electronically carried on any medium, such as communication signals transferred via wired or wireless connection, and the present disclosure suitably includes its equivalent.

The electronic device in accordance with the embodiments of the present disclosure may receive and store the program from a program provider connected thereto via cable or wirelessly. The program provider may include a memory for storing programs having instructions to perform the embodiments of the present disclosure, information necessary for the embodiments of the present disclosure, etc., a communication unit for wired/wirelessly communicating with mobile devices, and a controller for sending the program to the mobile devices on request or automatically.

The invention claimed is:

1. A method for managing multimedia data in a content server, the method comprising:
    receiving, from a cache server based on receiving a request of a media component from a client, a first request message requesting chunk information for the media component, wherein the media component is segmented into a plurality of chunks and the chunk information includes an identifier (ID) of each of the plurality of chunks, each ID being a hash value generated based on media data in each chunk;
    in response to the first request message, transmitting, to the cache server, a first response message including the chunk information, wherein each ID in the chunk information is used for checking a sameness or a similarity between a corresponding chunk of the plurality of chunks and at least one cached chunk stored in the cache server;
    receiving, from the cache server, a second request message requesting at least one first chunk of the plurality of chunks based on a result of the checking; and
    in response to the second request message, transmitting, to the cache server, a second response message including the at least one first chunk,
    wherein the media component is reconstructed based on the at least one first chunk received from the content server and one or more cached chunk stored in the cache server and the reconstructed media component is transmitted to the client.

2. The method of claim 1, wherein the at least one first chunk requested from the cache server is not stored in the cache server.

3. The method of claim 2, wherein the at least one first chunk transmitted from the content server is stored in the cache server.

4. The method of claim 1, wherein the at least one first chunk includes media data.

5. The method of claim 1, wherein the at least one first chunk is a next sequential chunk of the media component that is not stored in the cache server.

6. The method of claim 5, wherein a second chunk that is not sequential with the at least one first chunk is excluded from the reconstructed media component.

7. A content server for managing multimedia data, the content server comprising:

a transceiver configured to transmit and receive a data; and at least one processor configured to:

receive, from a cache server via the transceiver based on receiving a request of a media component from a client, a first request message requesting chunk information for the media component, wherein the media component is segmented into a plurality of chunks and the chunk information includes an identifier (ID) of each of the plurality of chunks, each ID being a hash value generated based on media data in each chunk, in response to the first request message, transmit, to the cache server via the transceiver, a first response message including the chunk information, wherein each ID in the chunk information is used for checking a sameness or a similarity between a corresponding chunk of the plurality of chunks and at least one cached chunk stored in the cache server, receive, from the cache server via the transceiver, a second request message requesting at least one first chunk of the plurality of chunks based on a result of the checking, and in response to the second request message, transmit, to the cache server via the transceiver, a second response message including the at least one first chunk, wherein the media component is reconstructed based on the at least one first chunk received from the content server and one or more cached chunk stored in the cache server and the reconstructed media component is transmitted to the client.

8. The content server of claim 7, wherein the at least one first chunk requested from the cache server is not stored in the cache server.

9. The content server of claim 8, wherein the at least one first chunk transmitted from the content server is stored in the cache server.

10. The content server of claim 7, wherein the at least one first chunk includes media data.

11. The content server of claim 7, wherein the at least one first chunk is a next sequential chunk of the media component that is not stored in the cache server.

12. The content server of claim 11, wherein a second chunk that is not sequential with the at least one first chunk excluded from the reconstructed media component.

* * * * *